(12) United States Patent
Buchanan

(10) Patent No.: US 11,511,818 B2
(45) Date of Patent: Nov. 29, 2022

(54) TRACK DRIVE

(71) Applicant: MTD PRODUCTS INC, Valley City, OH (US)

(72) Inventor: Peter J. Buchanan, Elyria, OH (US)

(73) Assignee: MTD PRODUCTS INC, Valley City, OH (US)

( * ) Notice: Subject to any disclaimer, the term of this patent is extended or adjusted under 35 U.S.C. 154(b) by 778 days.

(21) Appl. No.: 16/121,622

(22) Filed: Sep. 4, 2018

(65) Prior Publication Data

US 2019/0071140 A1 Mar. 7, 2019

Related U.S. Application Data

(60) Provisional application No. 62/554,165, filed on Sep. 5, 2017.

(51) Int. Cl.
*B62D 55/12* (2006.01)
*B62D 55/065* (2006.01)
(Continued)

(52) U.S. Cl.
CPC ........... *B62D 55/12* (2013.01); *B62D 55/065* (2013.01); *B62D 55/0847* (2013.01);
(Continued)

(58) Field of Classification Search
CPC .......................... B62D 55/065; B62D 55/084; B62D 55/0847; B62D 55/10; B62D 55/104;
(Continued)

(56) References Cited

U.S. PATENT DOCUMENTS 1,836,446 A 12/1931 Christie
2,719,062 A 9/1955 Arps
(Continued)

FOREIGN PATENT DOCUMENTS

CN 1760076 4/2006
CN 202491864 10/2012
(Continued)

OTHER PUBLICATIONS

International Search Report and Written Opinion dated Oct. 11, 2013 for related PCT/US2013/049278.
(Continued)

*Primary Examiner* — Jason R Bellinger
(74) *Attorney, Agent, or Firm* — Wegman Hessler

(57) ABSTRACT

A track drive for outdoor power equipment has a support frame with a centerline and a hub bearing attached to the support frame. A drive sprocket having a nesting interior half and exterior half is attached to the hub bearing, which enables the drive sprocket to rotate relative to the support frame. The drive sprocket is attached to an associated drive hub of a piece of outdoor power equipment. Drive sprocket teeth are spaced radially about the drive sprocket, with a first set of drive teeth attached to the interior half sprocket and located on an interior side of the support frame. A second set of drive teeth are attached to the exterior half sprocket and located on an exterior side of the support frame. The drive sprocket transmits a rotational force to an endless track to rotate the endless track and propel the outdoor power equipment.

19 Claims, 9 Drawing Sheets

(51) Int. Cl.
*B62D 55/30* (2006.01)
*B62D 55/084* (2006.01)
*B62D 55/135* (2006.01)
B62D 55/108 (2006.01)
B62D 55/14 (2006.01)
B62D 55/10 (2006.01)

(52) U.S. Cl.
CPC ........... *B62D 55/135* (2013.01); *B62D 55/30* (2013.01); *B62D 55/10* (2013.01); *B62D 55/108* (2013.01); *B62D 55/14* (2013.01); *B62D 55/305* (2013.01)

(58) Field of Classification Search
CPC ...... B62D 55/12; B62D 55/125; B62D 55/13; B62D 55/135; B62D 55/14; B62D 55/30; B62D 55/305
See application file for complete search history.

(56) References Cited

U.S. PATENT DOCUMENTS

| | | |
|---|---|---|
| 2,779,636 A | 1/1957 | Allen |
| 3,183,016 A | 5/1965 | Gustafsson |
| 3,216,520 A | 11/1965 | Blonsky |
| 3,435,908 A | 4/1969 | Oldenburg |
| 3,664,449 A | 5/1972 | Vardell |
| 3,744,583 A | 7/1973 | Bedard |
| 3,789,942 A | 2/1974 | Kowalik |
| 3,826,388 A | 7/1974 | Oldenburg |
| 3,860,079 A | 1/1975 | Hoffman |
| 3,888,132 A | 6/1975 | Russ, Sr. |
| 3,933,213 A | 1/1976 | Trowbridge |
| 3,938,605 A | 2/1976 | Koch |
| 3,938,606 A | 2/1976 | Yancey |
| 3,948,331 A | 4/1976 | Esch |
| 4,003,608 A | 1/1977 | Carter |
| 4,043,417 A | 8/1977 | Orpana |
| 4,166,511 A | 9/1979 | Stedman |
| 4,221,272 A | 9/1980 | Kell |
| 4,304,313 A | 12/1981 | van der Lely |
| 4,325,443 A | 4/1982 | Fischer |
| 4,458,955 A | 7/1984 | Webb |
| 4,462,480 A | 7/1984 | Yasui |
| 4,501,452 A | 2/1985 | Huang |
| 4,513,833 A | 4/1985 | Sheldon |
| 4,618,015 A | 10/1986 | Yochum |
| 4,683,970 A | 8/1987 | Smith |
| 4,706,769 A | 11/1987 | Latourelle |
| 4,953,919 A | 9/1990 | Langford |
| 4,987,965 A | 1/1991 | Bourret |
| 5,273,126 A | 12/1993 | Reed |
| 5,295,917 A * | 3/1994 | Hannum ............... F16H 55/12 474/95 |
| 5,316,381 A | 5/1994 | Isaacson |
| 5,318,141 A | 6/1994 | Hansen |
| 5,372,212 A | 12/1994 | Davis |
| 5,393,134 A | 2/1995 | Oertley |
| 5,409,075 A | 4/1995 | Nieman |
| 5,409,305 A | 4/1995 | Nagorcka |
| 5,575,347 A | 11/1996 | Uchibaba |
| 5,607,210 A | 3/1997 | Brazier |
| 5,622,234 A | 4/1997 | Nagorcka |
| 5,727,643 A | 3/1998 | Kawano |
| 5,791,429 A | 8/1998 | Bergman |
| 5,860,486 A | 1/1999 | Boivin |
| 5,899,541 A | 5/1999 | Ying |
| 5,899,543 A | 5/1999 | Lykken |
| RE36,284 E | 8/1999 | Kelderman |
| 5,938,301 A | 8/1999 | Hostetler |
| 5,975,226 A | 11/1999 | Matsumoto |
| 5,988,775 A | 11/1999 | Nordberg |
| 6,000,766 A | 12/1999 | Takeuchi |
| 6,006,847 A | 12/1999 | Knight |
| 6,074,025 A | 6/2000 | Juncker |
| 6,123,399 A | 9/2000 | Snyder |
| 6,135,220 A | 10/2000 | Gleasman |
| 6,164,399 A | 12/2000 | Bays |
| 6,199,646 B1 | 3/2001 | Tani |
| 6,241,327 B1 | 6/2001 | Gleasman |
| 6,253,867 B1 | 7/2001 | Lillbacka |
| 6,260,465 B1 | 7/2001 | Zonak |
| 6,289,995 B1 | 9/2001 | Fuller |
| 6,450,280 B1 | 9/2002 | Pepka |
| 6,485,115 B1 | 11/2002 | Egle |
| 6,543,862 B1 | 4/2003 | Kahle et al. |
| 6,547,345 B2 | 4/2003 | Phely |
| 6,595,603 B2 | 7/2003 | Rutz |
| 6,615,939 B1 | 9/2003 | Karales |
| 6,655,482 B2 | 12/2003 | Simmons |
| 6,733,093 B2 | 5/2004 | Deland |
| 6,810,975 B2 | 11/2004 | Nagorcka |
| 6,840,338 B2 | 1/2005 | Bowers |
| 6,860,571 B2 | 3/2005 | Scheetz |
| 6,892,838 B2 | 5/2005 | Bowers |
| 6,904,986 B2 | 6/2005 | Brazier |
| 6,926,108 B1 | 8/2005 | Polakowski |
| 7,017,688 B2 | 3/2006 | Bowers |
| 7,131,508 B2 | 11/2006 | Brazier |
| 7,267,414 B2 | 9/2007 | Scheetz |
| 7,328,760 B2 | 2/2008 | Inaoka |
| 7,367,637 B2 | 5/2008 | Gleasman |
| 7,416,266 B2 | 8/2008 | Soucy |
| 7,478,688 B2 | 1/2009 | Ki |
| 7,520,348 B2 | 4/2009 | Bergsten |
| 7,552,785 B2 | 6/2009 | Tuhy |
| 7,562,727 B1 | 7/2009 | Hoffart |
| 7,575,289 B2 | 8/2009 | Sugihara |
| 7,597,161 B2 | 10/2009 | Brazier |
| 7,641,006 B2 | 1/2010 | Scheetz |
| 7,644,788 B2 | 1/2010 | Scheetz |
| 7,673,711 B1 | 3/2010 | Berg |
| 7,708,092 B2 | 5/2010 | Després |
| 7,784,884 B2 | 8/2010 | Soucy |
| 8,002,365 B2 | 8/2011 | Jacobsen |
| 8,083,242 B2 | 12/2011 | Brazier |
| 8,104,846 B2 | 1/2012 | Porubcansky |
| 8,152,248 B2 | 4/2012 | Brazier |
| 8,430,188 B2 | 4/2013 | Hansen |
| 8,746,815 B2 | 6/2014 | Reshad |
| 8,783,390 B2 | 7/2014 | Maeda |
| 8,855,861 B2 | 10/2014 | Goebel |
| 9,008,915 B2 | 4/2015 | Kang |
| 9,457,854 B2 | 10/2016 | Van Mill |
| 9,566,858 B2 | 2/2017 | Hicke |
| 9,586,634 B2 | 3/2017 | Buchanan |
| 9,688,324 B2 | 6/2017 | Eavenson, Sr. et al. |
| 9,828,047 B2 | 11/2017 | Eavenson, Sr. |
| 9,884,662 B2 | 2/2018 | Eavenson, Sr. |
| 9,902,441 B2 | 2/2018 | Buchanan |
| 10,155,554 B2 | 12/2018 | Eavenson |
| 10,202,154 B2 | 2/2019 | Eavenson, Sr. |
| 10,202,155 B2 | 2/2019 | Eavenson, Sr. |
| 10,427,735 B2 | 10/2019 | Eavenson, Sr. |
| 2002/0153188 A1 | 10/2002 | Brandt |
| 2003/0180370 A1 | 9/2003 | Lesniak |
| 2004/0099451 A1 | 5/2004 | Nagorcka |
| 2004/0244349 A1 | 12/2004 | Meier |
| 2005/0035655 A1 | 2/2005 | Beckstrom |
| 2005/0056468 A1 | 3/2005 | Tucker |
| 2005/0248214 A1 | 11/2005 | Sugihara |
| 2006/0180370 A1 | 8/2006 | Polakowski |
| 2009/0278403 A1 | 11/2009 | Canossa |
| 2009/0308669 A1 | 12/2009 | Vos |
| 2010/0012399 A1 | 1/2010 | Hansen |
| 2010/0060075 A1 | 3/2010 | Hansen |
| 2010/0139994 A1 | 6/2010 | Hansen |
| 2010/0307843 A1 | 12/2010 | Lawson |
| 2012/0161511 A1 | 6/2012 | Brazier |
| 2012/0193979 A1 | 8/2012 | Pard |
| 2012/0242142 A1 | 9/2012 | Kautsch |
| 2013/0026819 A1 | 1/2013 | Reshad et al. |
| 2013/0126196 A1 | 5/2013 | Rosenboom |
| 2013/0192905 A1 | 8/2013 | Janzen |

(56) References Cited

U.S. PATENT DOCUMENTS

| | | |
|---|---|---|
| 2014/0175865 A1 | 6/2014 | Korus |
| 2014/0288763 A1 | 9/2014 | Bennett |
| 2014/0305715 A1 | 10/2014 | Makino |
| 2015/0129329 A1 | 5/2015 | Cox |
| 2015/0134202 A1 | 5/2015 | Dawson |
| 2016/0052569 A1 | 2/2016 | Buchanan et al. |
| 2019/0071140 A1 | 3/2019 | Buchanan |

FOREIGN PATENT DOCUMENTS

| | | |
|---|---|---|
| DE | 1200144 | 9/1965 |
| DE | 10251637 | 5/2004 |
| EP | 0578504 | 2/1997 |
| EP | 1151910 B1 | 11/2001 |
| JP | 07205852 A | 8/1995 |
| JP | H07205852 | 8/1995 |
| JP | 10129544 | 5/1998 |
| JP | 3937643 | 6/2007 |
| KR | 1020010078749 | 8/2001 |
| WO | 9311022 | 6/1993 |
| WO | 2014008378 | 1/2014 |

OTHER PUBLICATIONS

International Search Report and Written Opinion dated Oct. 7, 2013 for related PCT/US2013/049289.
International Search Report and Written Opinion dated Dec. 5, 2014 for related PCT/US2014/055424.
International Search Report and Written Opinion dated Dec. 7, 2016 for related PCT/US2016/035025.
International Search Report and Written Opinion dated Nov. 5, 2015 for related PCT/US2015/046266.
Office Action dated Apr. 1, 2017 for related CN App. No. 201480050347.5.
Office Action dated Feb. 5, 2018 for related CN App. No. 201480050347.5.
International Search Report and Written Opinion dated Jan. 11, 2019 for International Application No. PCT/US2018/049559.
Office Action of Related Chinese Patent Application No. 201480050347.5, dated Apr. 1, 2017, pp. 1-11.
EPC Communication pursuant to Article 94(3) EPC for corresponding European Patent Application No. 1477226.3 dated Nov. 8, 2018 (pp. 1-3).
EPC Communication pursuant to Article 94(3) EPC for corresponding European Patent Application No. 16729432.1 dated Mar. 19, 2019 (pp. 1-6).
International Search Report and Written Opinion dated Jan. 11, 2019, for related PCT/US2018/049559 (pp. 1-17).
Office Action of Related Canadian Patent Application No. 2,878,283 dated May 30, 2019, pp. 1-3.
Office Action of Related Canadian Patent Application No. 2,878,285 dated Apr. 30, 2019, pp. 1-3.
Communication under Rule 71(3) EPC for corresponding European Patent Application No. 15763446.0 dated Jun. 21, 2019 (pp. 1-7).
Office Action of Related Chinese Patent Application No. 201811234444.6, dated Sep. 5, 2019, pp. 1-10, English translation.
Office Action of Related Chinese Patent Application No. 201811234444.6, dated Sep. 5, 2019, pp. 1-7.
Office Action of Related Australian Patent Application No. 2016271322 dated Mar. 2, 2020 (pp. 1-7).
EPC Communication pursuant to Article 94(3) EPC for corresponding European Patent Application No. 16729432.1 dated Sep. 21, 2020 (pp. 1-6).
Office Action of Related Canadian Patent Application No. 2,923,229 dated Nov. 12, 2020, pp. 1-3.
Communication under Rules 161(2) and 162 EPC for corresponding European Patent Application No. 18854199.9 dated Jun. 25, 2020 (pp. 1-3).
Examination Report for corresponding Australian Patent Application No. 2018330078, dated Feb. 8, 2021, 5 pages long.
European Search Report for corresponding European Patent Application No. 18854199.9 dated Sep. 30, 2021, 10 pages long.
EPC Communication pursuant to Rules 70(2) and 70a(2) EPC for corresponding European Patent Application No. 18854199.9 dated Oct. 19, 2021, 1 page.
EPC Communication pursuant to Article 94(3) EPC for corresponding European Patent Applicant No. 167297432.1 dated May 3, 2022, 4 pages long.

* cited by examiner

TRACK DRIVE

CROSS-REFERENCE TO RELATED APPLICATIONS

This application claims priority to U.S. Provisional Application Ser. No. 62/554,165, filed Sep. 5, 2017, which is herein incorporated by reference in its entirety.

FIELD OF THE DISCLOSURE

This application relates generally to outdoor power equipment, and more specifically to outdoor power equipment including track drives.

BACKGROUND OF THE INVENTION

Currently available track drives for power equipment are generally provided with mechanisms including sprockets having removable sectors which aid in installation and removal of endless tracks, or have sprockets that are unitary pieces that are difficult to install and remove. These offerings can limit performance due to lateral derailment of tracks, drive lug skipping, and backlash impacts during load and direction reversals.

Other replacement track drive options designed to convert steered "wheeled" configurations to tracked configurations often include limitations that affect performance, such as a relatively large scrub area and the relatively large force required to steer the track drive. Accordingly, improvements to outdoor power equipment, such as electric lawn maintenance vehicles, are desired.

BRIEF SUMMARY OF THE INVENTION

The following presents a simplified summary in order to provide a basic understanding of some example aspects of the disclosure. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

According to one aspect, the subject application involves a track drive for outdoor power equipment including a support frame having a support frame centerline. The track drive also includes a hub bearing attached to the support frame. The track drive further includes a drive sprocket attached to the hub bearing. The drive sprocket includes an interior half sprocket and an exterior half sprocket with the interior half sprocket being configured to nest within the exterior half sprocket. The drive sprocket is configured to attach to an associated drive hub on the outdoor power equipment. The drive sprocket comprises drive teeth spaced radially about the drive sprocket. A first set of the drive teeth are attached to the interior half sprocket and are located on an interior side of the support frame. Similarly, a second set of the drive teeth are attached to the exterior half sprocket and are located on an exterior side of the support frame. The hub bearing enables the drive sprocket to rotate relative to the support frame. The track drive still further includes an endless track, and the drive sprocket is movably engaged with the endless track to transmit a rotational force to rotate the endless track and propel the outdoor power equipment.

According to another aspect, the subject application involves an outdoor power equipment unit having a track drive. The track drive includes a support frame having a support frame centerline. The track drive also includes a hub bearing attached to the support frame. The track drive further includes a drive sprocket attached to the hub bearing. The drive sprocket includes an interior half sprocket and an exterior half sprocket, and the interior half sprocket is configured to nest within the exterior half sprocket. The drive sprocket is configured to attach to an associated drive hub on the outdoor power equipment. The drive sprocket comprises drive teeth spaced radially about the drive sprocket. A first set of the drive teeth are attached to the interior half sprocket and are located on an interior side of the support frame. Similarly, a second set of the drive teeth are attached to the exterior half sprocket and are located on an exterior side of the support frame. The hub bearing enables the drive sprocket to rotate relative to the support frame. The track drive still further includes an endless track, and the drive sprocket is movably engaged with the endless track to transmit a rotational force to rotate the endless track and propel the outdoor power equipment.

According to another aspect, the subject application involves a kit for adding or replacing a track drive of outdoor power equipment including a track drive assembly. The track drive assembly includes a support frame having a support frame centerline. The track drive assembly also includes a hub bearing attached to the support frame. The track drive assembly further includes a drive sprocket attached to the hub bearing. The drive sprocket includes an interior half sprocket and an exterior half sprocket and the interior half sprocket is configured to nest within the exterior half sprocket. The drive sprocket is configured to attach to an associated drive hub on the outdoor power equipment. The drive sprocket includes drive teeth spaced radially about the drive sprocket. A first set of the drive teeth are attached to the interior half sprocket and are located on an interior side of the support frame. Similarly, a second set of the drive teeth are attached to the exterior half sprocket and are located on an exterior side of the support frame. The hub bearing enables the drive sprocket to rotate relative to the support frame. The track drive assembly still further includes an endless track, and the drive sprocket is movably engaged with the endless track to transmit a rotational force to rotate the endless track and propel the outdoor power equipment. The kit also includes a plurality of hardware fasteners.

According to still another aspect, the subject application involves a track drive for outdoor power equipment including a support frame having a support frame centerline. The track drive also includes a hub bearing attached to the support frame. The track drive further includes a drive sprocket attached to the hub bearing. The drive sprocket includes an interior half sprocket and an exterior half sprocket, the interior half sprocket is configured to nest within the exterior half sprocket. The drive sprocket is configured to attach to an associated drive hub on the outdoor power equipment. The drive sprocket includes drive teeth spaced radially about the drive sprocket. A first set of the drive teeth are attached to the interior half sprocket and are located on an interior side of the support frame. Similarly, a second set of the drive teeth are attached to the exterior half sprocket and are located on an exterior side of the support frame. The hub bearing enables the drive sprocket to rotate relative to the support frame. The track drive still further includes an endless track. The track drive also includes an outer support link attached to the support frame. The outer support link is configured to support a bogie wheel in a cantilever arrangement. The drive sprocket is movably engaged with the endless track to transmit a rotational force to rotate the endless track and propel the outdoor power equipment.

BRIEF DESCRIPTION OF THE DRAWINGS

The foregoing and other aspects of the present disclosure will become apparent to those skilled in the art to which the present disclosure relates upon reading the following description with reference to the accompanying drawings, in which.

DETAILED DESCRIPTION OF THE PREFERRED EMBODIMENT

Figure 1:
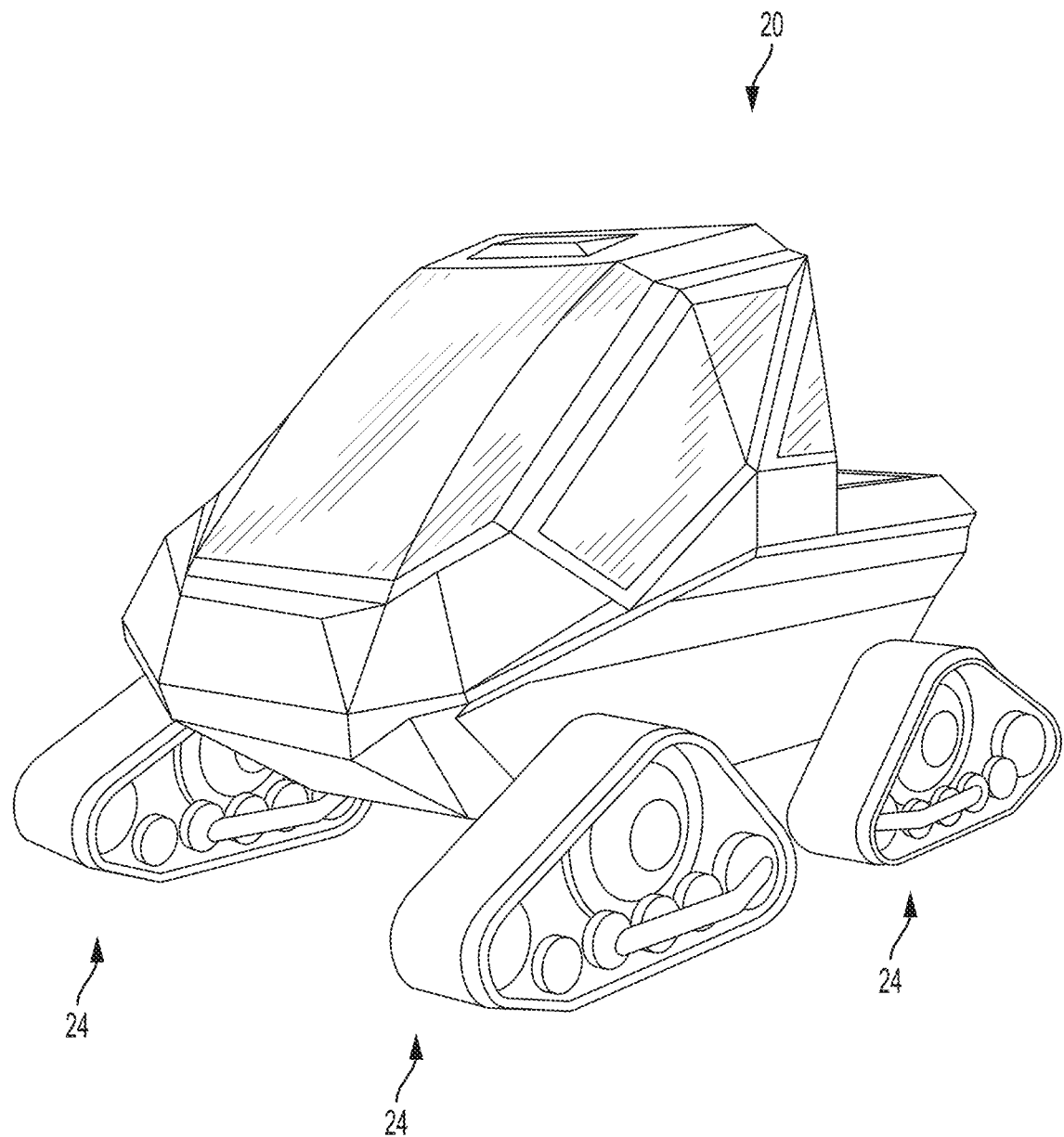
FIG. 1 is a perspective view of an example outdoor power equipment with a track drive in accordance with aspects of the present disclosure.

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

FIG. 1 shows a perspective view of a piece of outdoor power equipment 20 including a track drive 24 according to at least one aspect of the present disclosure. For the purposes of this disclosure, the outdoor power equipment unit 20 can include, but is not limited to: garden tractors, all-terrain vehicles (ATV), utility vehicles (UV), farm tractors, lawn maintenance vehicles, electric lawn maintenance vehicles, etc. However, for the remainder of the disclosure, the outdoor power equipment unit 20 will be shown and discussed in the form of a utility vehicle. In one example, the track drive 24 can be attached to the power outdoor power equipment 20 as original equipment. In another example, the track drive 24 can be a replacement for a drive wheel such as a wheel and associated pneumatic tire.

Figure 2:
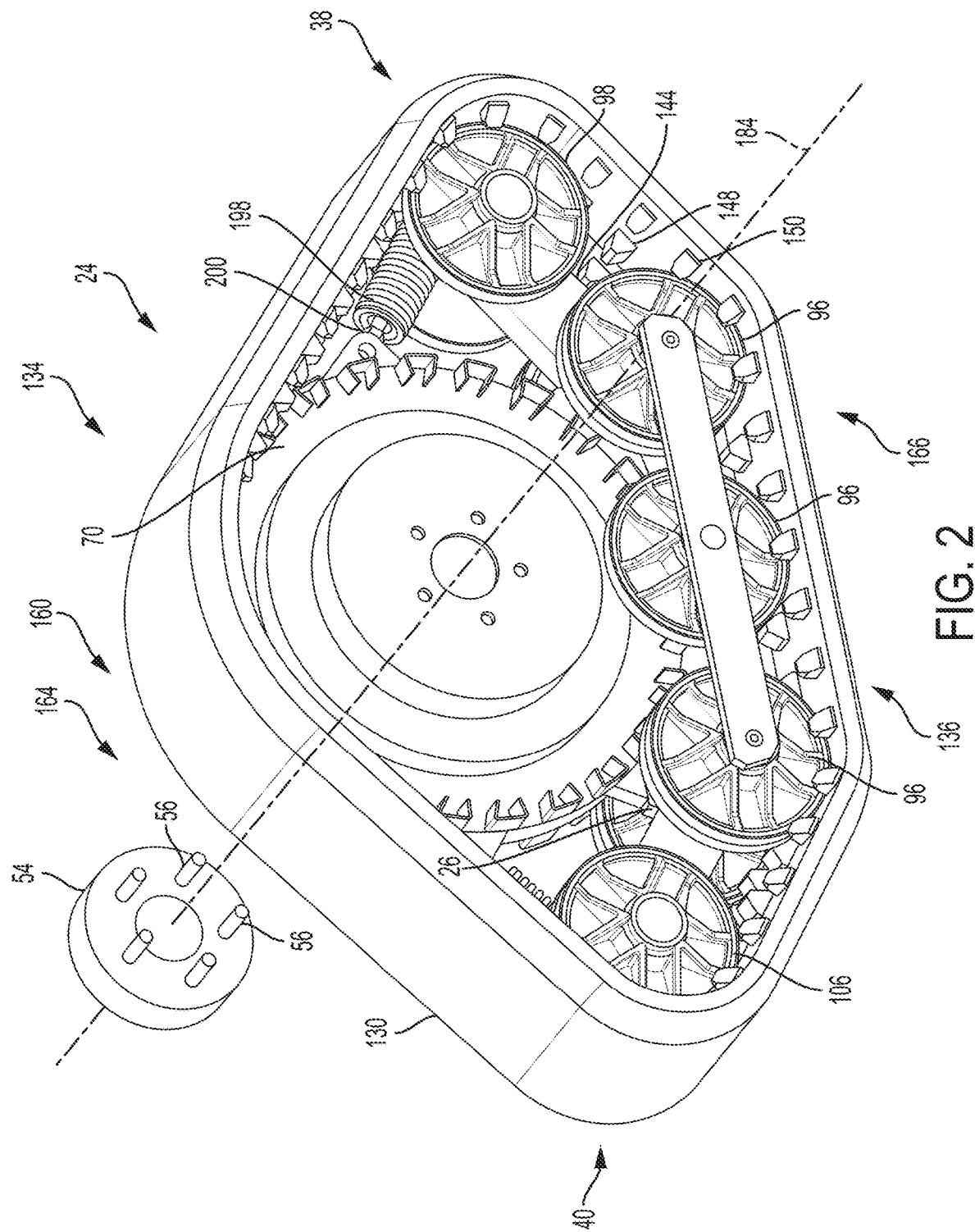
FIG. 2 is a perspective view of the track drive of the outdoor power equipment of FIG. 1 shown from an exterior side.
Figure 3:
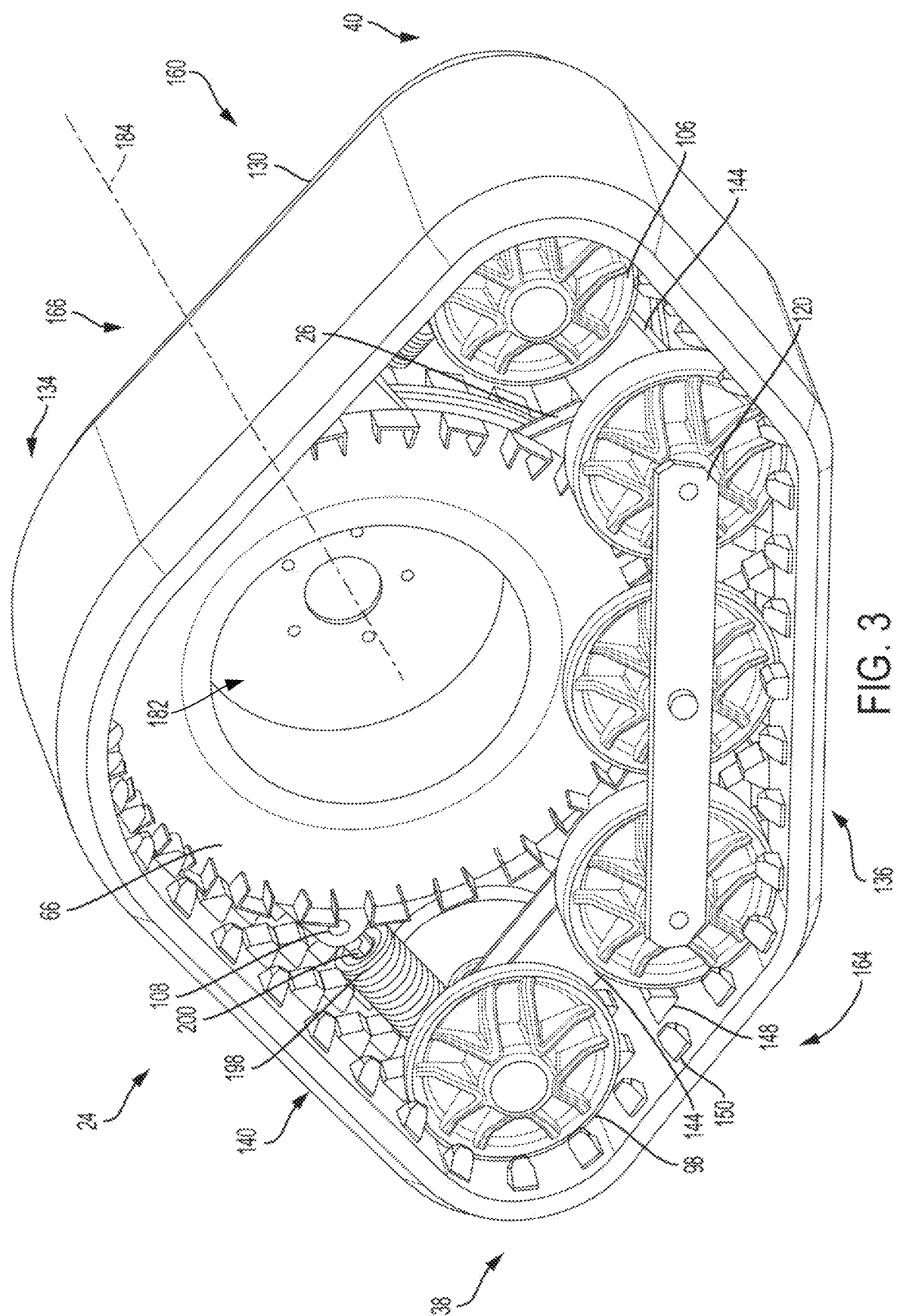
FIG. 3 is a perspective view of the track drive of the outdoor power equipment of FIG. 1 shown from an interior side.
Figure 4:
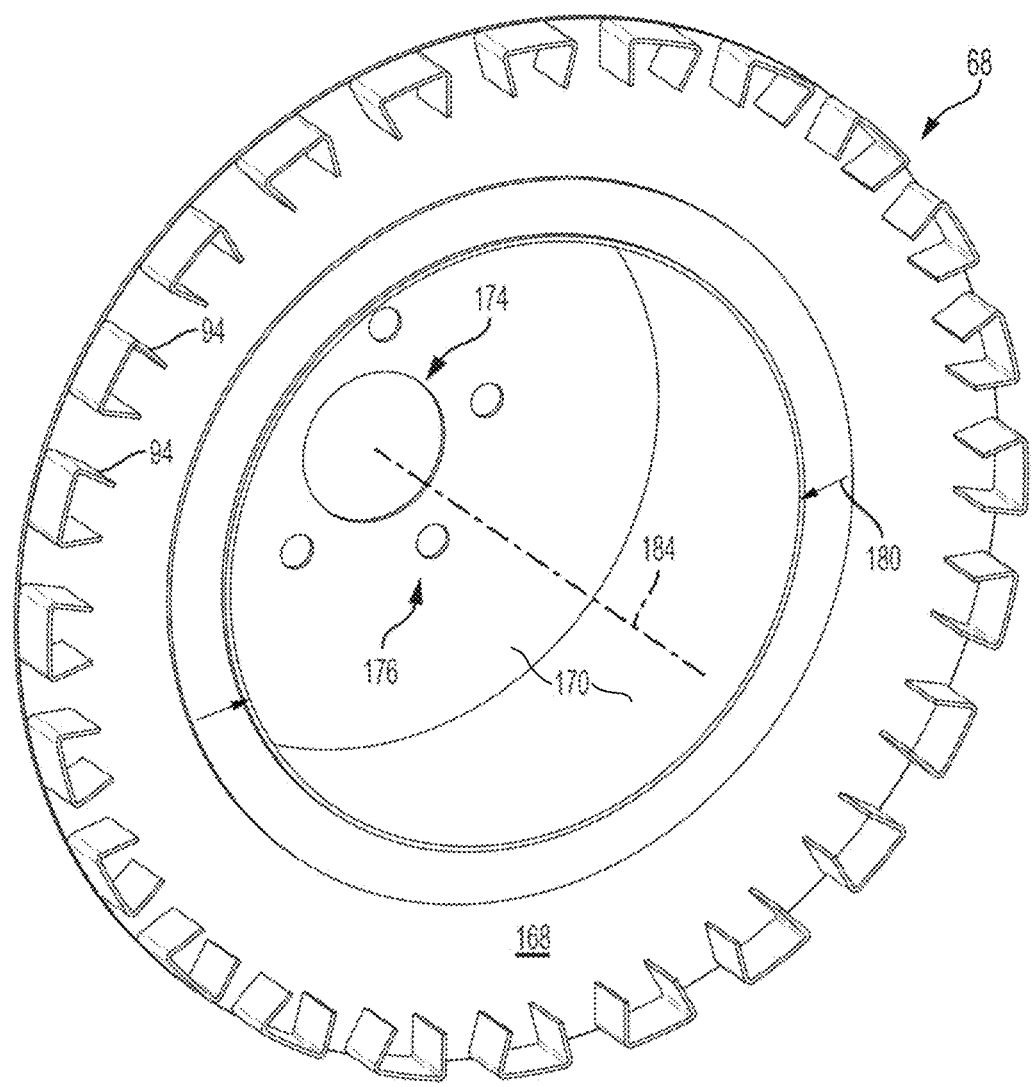
FIG. 4 is a perspective view of an interior half sprocket.
Figure 5:
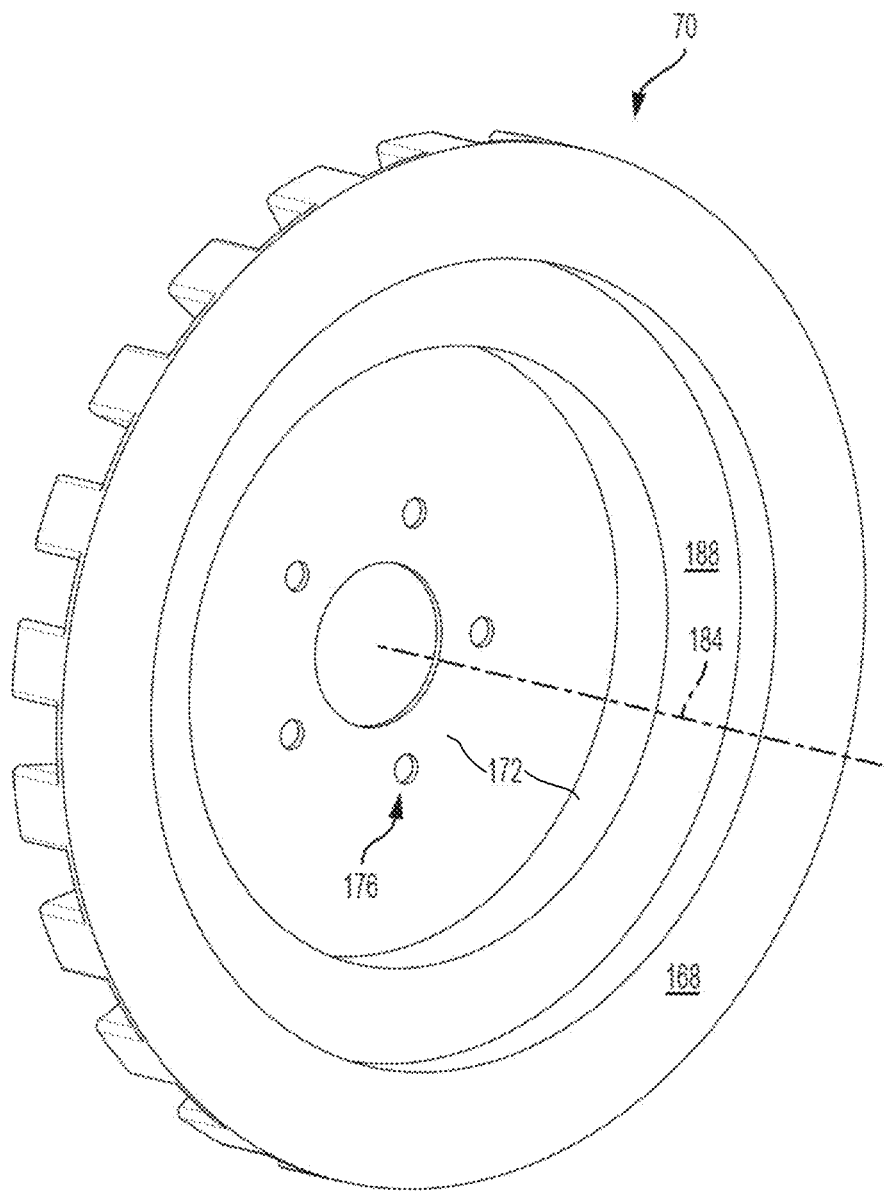
FIG. 5 is a perspective view of an exterior half sprocket.

Turning to FIG. 2, the track drive 24 includes a support frame 26 (best seen in FIG. 6) and a drive sprocket 66 that includes an interior half sprocket 68 (best seen in FIG. 4) and an exterior half sprocket 70 (best seen in FIG. 5). The half sprockets 68, 70 are located on either side of the support frame 26. In this instance, the term "either side" is meant to indicate that the interior half sprocket 68 is located between the support frame 26 and the outdoor power equipment unit 20 (an inboard or interior side 164), while the exterior half sprocket 70 is located on the opposing side of the support frame 26, which can be considered an "outboard" or exterior side 166. FIG. 2 shows an assembled track drive 24 viewed from an exterior side 166 of the track drive 24, while FIG. 3 shows an assembled track drive 24 viewed from the interior side 164 of the track drive 24.

Turning to FIG. 4, a detail perspective view of the interior half sprocket 68 is shown. The interior half sprocket 68 can include a flattened disk portion 168 and a cylindrical portion 170 extending away from the flattened disk portion 168 to represent a shape similar to that of a top hat. The cylindrical portion 170 includes a central aperture 174 and a plurality of mounting apertures 176 on a bolt ring having a greater diameter than a diameter of the central aperture 174. The cylindrical portion 170 of the interior half sprocket 70 has an inside diameter 180.

Turning to FIG. 5, a detail perspective view of the exterior half sprocket 70 is shown. The exterior half sprocket 70 is similar to the interior half sprocket 68, having a flattened disk portion 168 and a cylindrical portion 172 extending away from the flattened disk portion 168. However, the cylindrical portion 172 of the exterior half sprocket 70 is more shallow than the cylindrical portion 170 of the interior half sprocket 68. An outside diameter of the cylindrical portion 172 of the exterior half sprocket 70 is less than an inside diameter 180 of the cylindrical portion 170 of the interior half sprocket 68. With this configuration, the interior half sprocket 68 is configured to nest within the exterior half sprocket 70. In one example, the interior half sprocket 68 of FIG. 4 and the exterior half sprocket 70 of FIG. 5 are configured to nest together in a relatively snug fit. Such a fit can reduce and/or eliminate the opportunity for either half sprocket 68, 70 to leave its normal orientation centered about the central axis 184.

Additionally, the half sprockets 68, 70 can be formed of any suitable material, including, but not limited to steel, aluminum, plastic, or a combination of materials, such as a steel hub with over-molded plastic. Furthermore, each half sprocket 68, 70 can include a plurality of drive teeth 94 spaced radially about the half sprocket 68, 70. The drive teeth 94 can be of any suitable fashion to interact with structure on an endless track which will be described below. In one example, as shown in FIGS. 4 and 5, the drive teeth 94 can be generally triangular appendages from the half sprocket 68, 70 near the outside diameter of the half sprocket 68, 70. Each of the generally triangular appendages can include three sides, with two of the sides incomplete, such that the appendage is open toward the center of the half sprocket 68, 70. In another example, each of the drive teeth 94 can be rectangular or any other suitable shape. Regardless of the shape or form of the drive teeth 94, they are configured to transfer rotational power to another structure.

Returning to FIG. 2, the outdoor power equipment 20 includes an associated drive hub 54. The drive hub 54 is attached to or integrated into the drive axles of the outdoor power equipment 20. For example, the associated drive hub 54 can be a portion of a disc brake unit of the outdoor power equipment unit 20 that includes a plurality of threaded studs 56. The previously described mounting apertures 176 are located and sized to correspond to the threaded studs 56 such that the threaded studs 56 can pass through the mounting apertures 176 of the cylindrical portions 170, 172. In this arrangement, rotational power supplied by the outdoor power equipment unit 20 can be transferred from the drive hub 54 to the half sprockets 68, 70. Extension of the threaded studs 56 through the mounting apertures 176 defined by the half sprockets 68, 70 also enables efficient transfer of rotational power from the associated drive hub 54 to the half sprockets 68, 70. Fasteners such as threaded nuts (not shown) can then be applied to the threaded studs 56 in order to secure the half sprockets 68, 70 to the drive hub 54. This is but one example, and the half sprockets 68, 70 can be attached to the drive hub 54 in any suitable fashion.

Figure 6:
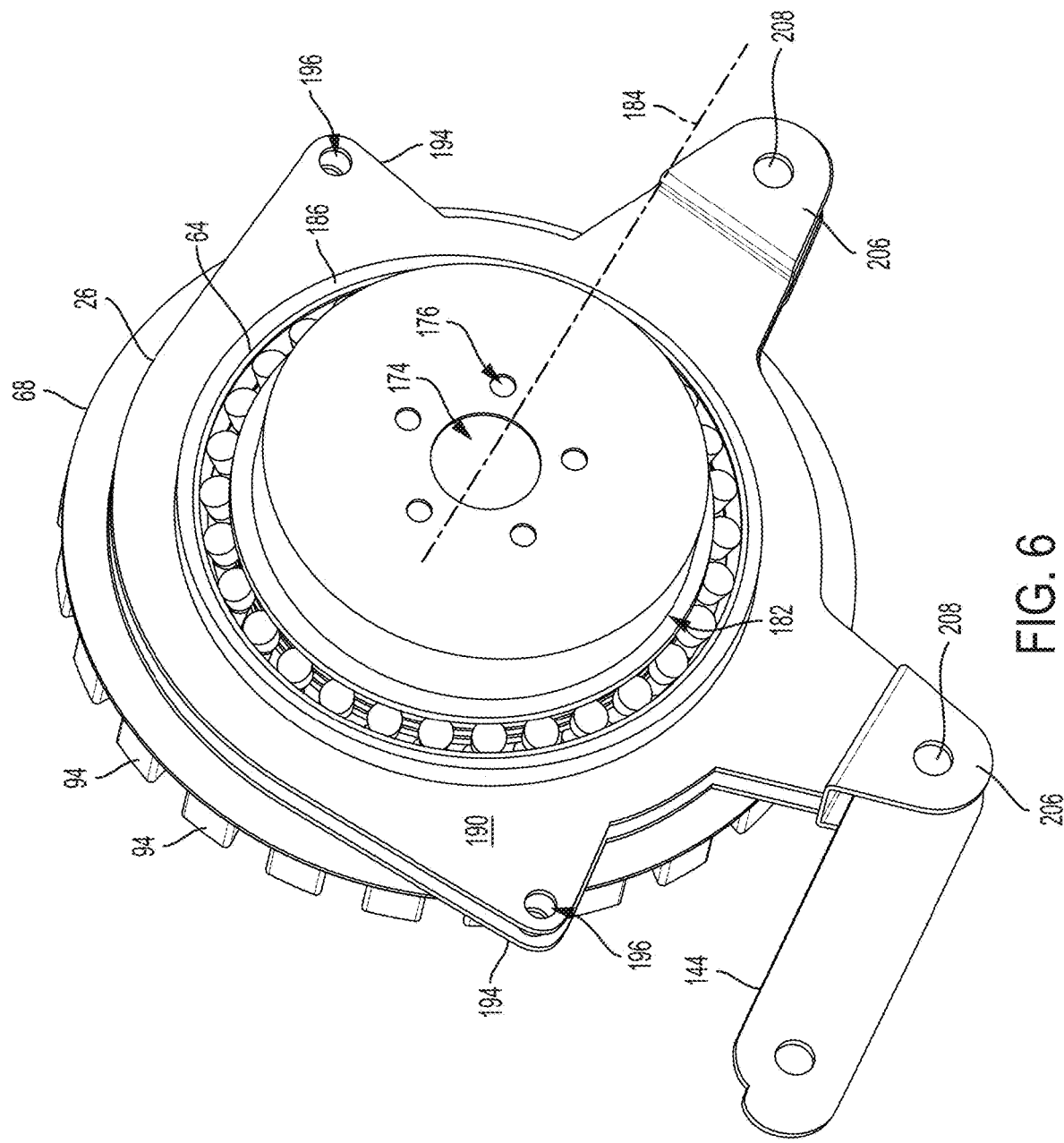
FIG. 6 is a detail perspective view of a portion of the track drive of FIG. 1 showing a support frame, the interior half sprocket, and a hub bearing.

Turning to FIG. 6, a detail view includes the interior half sprocket 68 located within the support frame 26. The support frame 26 defines a central aperture 182 configured to cooperate with a hub bearing 64. The hub bearing 64 is located within the central aperture 182 and, in turn, is located around the outside diameter of the interior half sprocket 68 (central aperture 182 is also shown in FIG. 3, unoccupied by hub bearing 64 and interior half sprocket 68). This arrangement enables the interior half sprocket 68 to spin freely within the support frame 26. On the side of the support frame 26 that faces the exterior side 166 of the outdoor power equipment 20, the support frame 26 can include a ridge 186. The ridge 186 on its inside diameter, provides surface area for mounting the hub bearing 64 to the support frame 26. As shown in FIG. 5, the exterior half sprocket 70 can define an annular area 188 that corresponds with the hub bearing 64 and the ridge 186. Thus, the interior half sprocket 68 includes the cylindrical portion 170 which is configured to nest within the exterior half sprocket 70. The cylindrical portion 170 is closest to the central axis 184. Moving radially away from the central axis 184, the annular area 188 is next, and, as described, the annular area 188 corresponds to the hub bearing 64 and the ridge 186 in the assembly of the track drive 24. Finally, the flattened disk portion 168 is at the radially outermost location and is located an axial distance from a flat portion 190 of the support frame 26 radially outward from the ridge 186. As noted above, the flattened disk portion 168 further includes the drive teeth 94.

The support frame 26 also includes two ears 194 that define apertures 196 used for attaching a resilient element 198, such as a coil spring. As shown in FIGS. 2 and 3, the resilient element 198 can act as a track tensioning mechanism 140 to maintain tension on the endless track 130. As shown, a pin 108 can be mounted within the aperture 196 defined by the ears 194 mounted to the support frame 26. In one example, a threaded member can be located within the resilient element 198 and can be adjusted by threaded members 200 to compress or extend the resilient element 198 to add or decrease tension within the endless track 130 by applying a force to the endless track 130 as a bogey wheel 98 is urged toward or away from the support frame 26. In the shown example, the track tensioning mechanism 140 includes a threaded member 200 to maintain tension on the endless track 130. As the threaded member 200 is turned to move the threaded member 200 toward an arm 144, the arm 144 is forced to rotate away from the support frame 26, thereby placing a force on the forward bogey wheel 98 to add tension to the endless track 130. Other examples are also contemplated. In one example, the track tensioning mechanism 140 can maintain the tension on the endless track 130 at a value of about 10% of the total vertical loading of the outdoor power equipment unit 20. The resilient element 198 can also provide a suspension function such as absorbing shock from small obstacles in the path of the track drive 24.

Each of the arms 144 are attached to the support frame 26 at legs 206 extending downward from the main body of the support frame 26 as shown in FIG. 6. Each leg defines an aperture 208 that can cooperate with a pin or other device to enable the arm 144 to be rotatably attached to the support frame 26. The arm 144 is also connected to the resilient element 198 at its other end and includes apertures (not shown) to enable attachment of the described bogey wheels 98, 106.

As shown in FIGS. 2 and 3, the track drive 24 can further include a plurality of idler wheels 96. Three of the idler wheels 96 can be located on the interior side 164 of the support frame 26 and three additional idler wheels 96 can be located on the exterior side 166 of the support frame 26. Similarly, the track drive 24 can further include a plurality of bogie wheels. On each of the interior and exterior sides of the track drive 24, a large bogie wheel 98 can be attached to the arm 144 at the forward end 38. A large bogie wheel 106 can also be attached to the arm 144 at a rear end 40. While the figures and the description describe a total of ten idler wheels 96 and bogie wheels 98, 106, it is to be appreciated that any suitable number of wheels 96, 98, 106 and arrangement of those wheels 96, 98, 106 can be used on the track drive 24. Additionally, the wheels 96, 98, 106 can be constructed of any suitable material including plastic and/or rubber and can include bearings.

Returning to FIGS. 2 and 3, the idler wheels 96 and bogie wheels 98, 106 can be attached to the support frame 26 in any suitable fashion. Additionally, the track drive 24 can also include an outer support link 120 configured to support the idler wheels 96 and bogie wheels 98, 106. The outer support link 120 can be attached to the support frame 26 through a number of idler wheels 96 and bogie wheels 98, 106.

The track drive 24 also includes an endless track 130. The endless track 130 is looped around the drive sprocket 66 and the idler wheels 96 and bogie wheels 98, 106. The drive sprocket 66 is movably engaged with the endless track 130 to transmit force to rotate the endless track 130 and propel the piece of outdoor power equipment 20. The drive sprocket 66 is engaged with the endless track 130 at a top portion 134 of the drive sprocket 66 and not engaged with the endless track 130 at a bottom portion 136 of the drive sprocket 66. In one example the half sprockets 68, 70 are located about one to two inches above the endless track 130 at the bottom portion 136 such that there is no contact between the half sprockets 68, 70 and the endless track 130 at that point. This can be readily seen in FIGS. 2 and 3.

The size of the drive sprocket 66 and its orientation with respect to the endless track 130 can be calculated and/or selected to have an effective rolling radius about the same as a rolling radius of a tire/wheel combination that may be typically attached to the outdoor power equipment 20. The endless track 130 can be constructed of any suitable material including layers of polymer and/or rubber materials with reinforcing layers of cloth, cord, and/or wire, Kevlar, polyester, etc. While not shown, the ground engaging side of the endless track 130 can include various tread designs to assist in traction.

In this arrangement, a weight of the outdoor power equipment 20 is transferred through the associated drive hub 54, the interior sprocket half 68, the hub bearing 64, the support frame 26, a combination of the bogie wheels 98, 106 and the idler wheels 96, the endless track 130, and into an associated driving surface 138. It is to be appreciated that the number and location of wheels 96, 98, 106 can be selected to limit the amount of weight supported by each wheel 96, 98, 106. In one example, the wheels 96, 98, 106 can be limited to supporting 100 pounds or less per each wheel 96, 98, 106. The wheels 96, 98, 106 transfer axial and radial loads through their respective axles to the support frame 26. Additionally, it is to be appreciated that the number of wheels 96, 98, 106 can also be selected and positioned to help ensure a relatively even distribution of weight on the endless track 130 from the front side 38 to the rear side 40.

Figure 8:
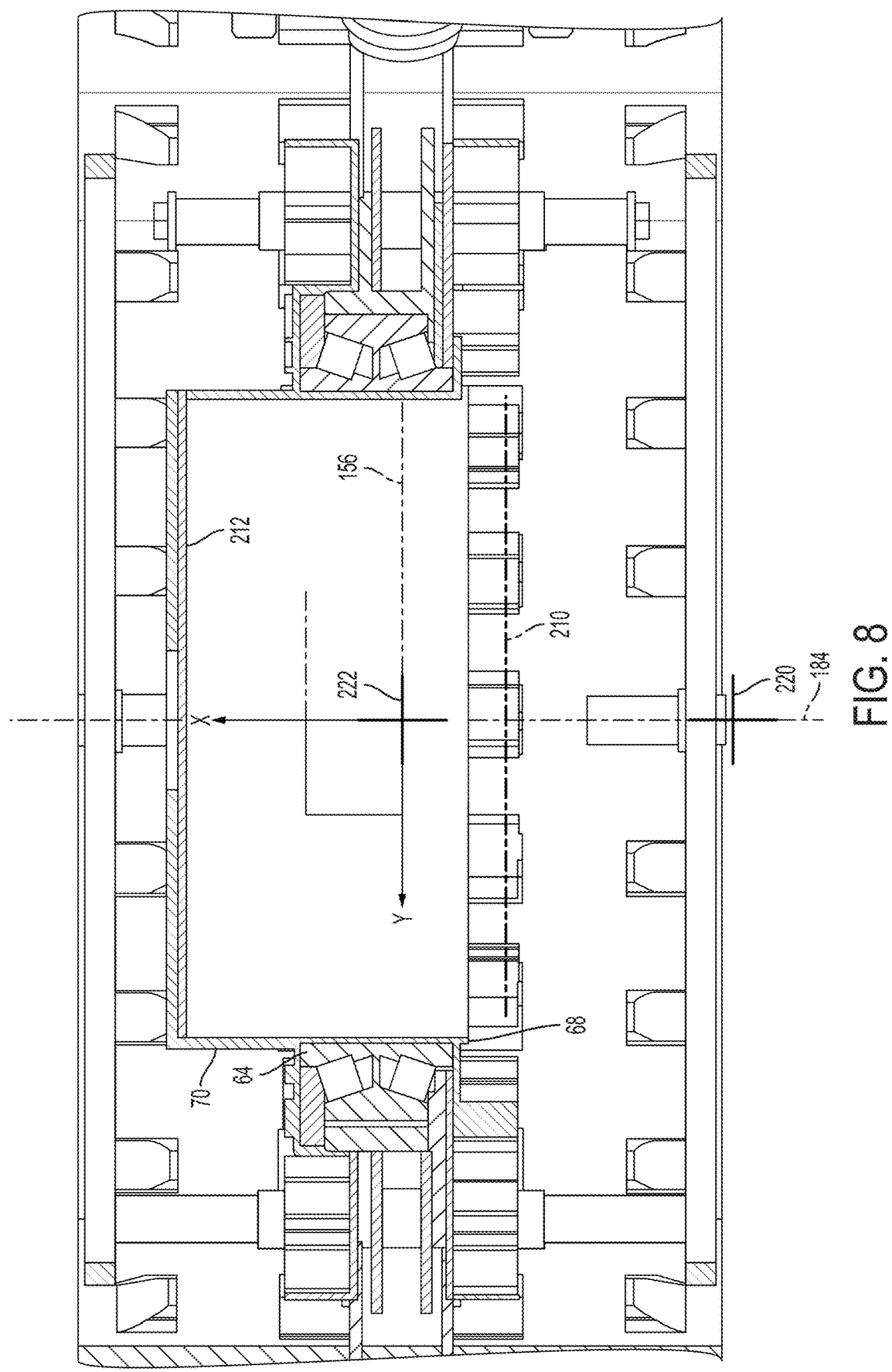
FIG. 8 is similar to FIG. 7 showing mounting surfaces and locations of turning radii.
Figure 9B:
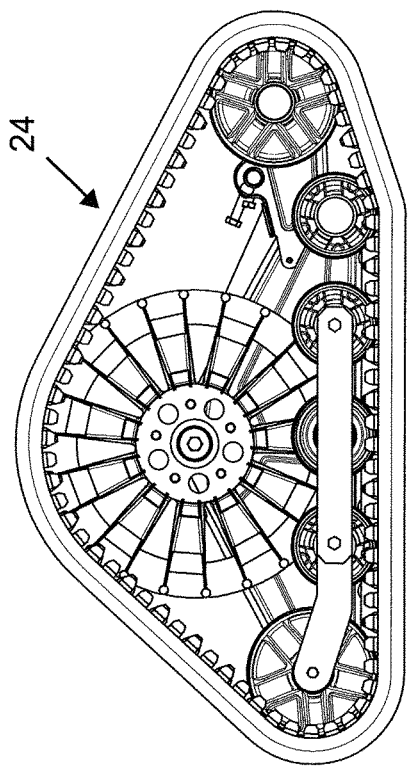
FIGS. 9A-D are elevations views of several embodiments of the track drive assembly of FIG. 1.
Figure 9D:
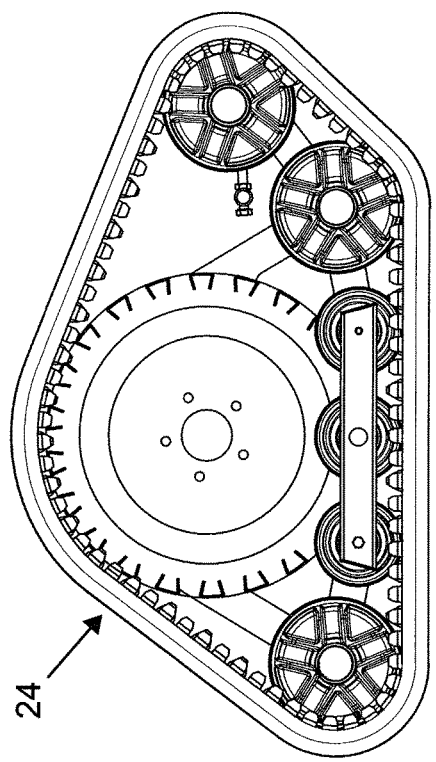
Figure 9A:
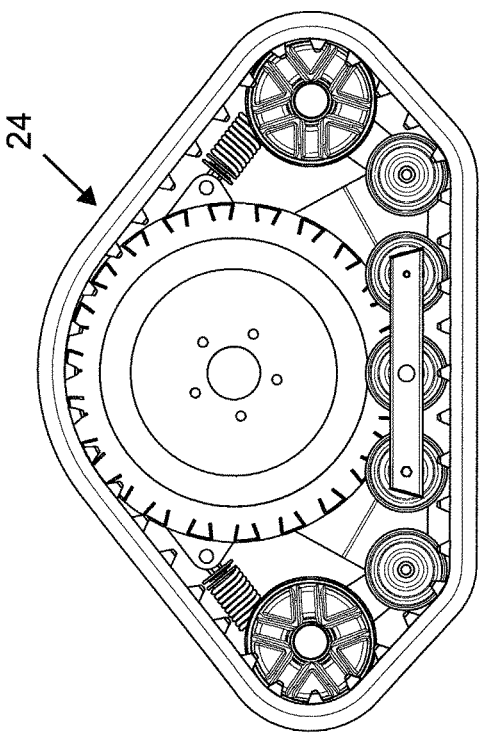
Figure 9C:
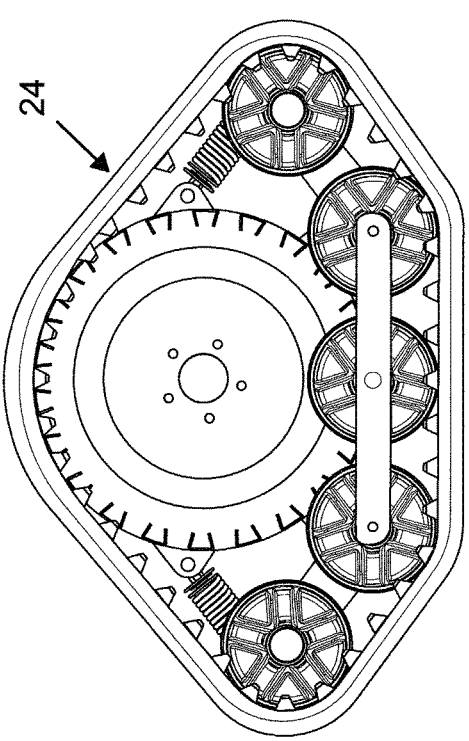

Remaining with FIGS. 2 and 3, the endless track 130 includes a plurality of drive lugs 148 which enable transfer of power between the drive sprocket 66 and the endless track 130, as is shown in FIG. 8. The drive lugs 148 are configured to interact with the drive teeth 94 of each half sprocket 68, 70. The endless track 130 engages the drive sprocket 66 about an arc of contact. The configuration of the drive lugs 148 and the drive teeth 94 and the distance between each can be calculated and designed to improve the arc of contact by having multiple engagements between individual drive lug 148 pairs and drive tooth 94 pairs along the arc of contact. For example, the distance between drive lugs 148 can be slightly less than the spacing between the drive teeth 94 (i.e., an under-pitch condition). This difference in measurements can account for variations in the endless track 130 and the curvature of the endless track 130 at the contact points with the drive sprocket 66. This arrangement of multiple contacts can help distribute the loading of forces on the drive lugs 148 and the drive teeth 94 over multiple pairs at any single time.

Additionally, the drive teeth 94 are configured to engage the drive lugs 148 close to the drive lug pitch line in order to reduce bending moments and stress on the drive lugs 148. Furthermore, the drive teeth 94 are configured to reduce and/or eliminate the drive teeth 94 "scrubbing" the areas between the drive lugs 148 during traction drive load force reversals, such as those that can occur during outdoor power equipment 20 acceleration, deceleration, and turning maneuvers.

In some instances, alignment of the half sprockets 68, 70 can be advantageous, and marks may be provided on the half-sprockets 68, 70 in order to rotationally align the half-sprockets 68, 70. Alignment of the half-sprockets 68, 70 can be advantageous in order to force the drive teeth 94 from each of the half sprockets 68, 70 to contact respective drive lugs 148 at the same time.

Remaining with FIGS. 2 and 3, the endless track 130 further includes a plurality of guide lugs 150 which help locate the endless track 130 with respect to the idler wheels 96 and the bogie wheels 98, 106. A side of the guide lugs 150 can interact with the vertical sides of the wheels 96, 98, 106 to help keep the endless track 130 in a desired orientation as it rotates about the track drive structure. The drive lugs 148 are positioned closer to the center of the endless track 130 while the guide lugs 150 are positioned closer to the outer edges of the endless track 130. As shown, the idler wheels 96 and the bogie wheels 98, 106 are positioned to engage in rolling contact with the endless track 130 in an area between the drive lugs 148 and the guide lugs 150.

In one example, the drive sprocket 66 is centrally positioned about a center line 156 of the endless track 130. Consequently, the support frame 26 is located substantially along the center line 156 of the endless track 130. The separation of the drive sprocket 66 into the interior half sprocket 68 and the exterior half sprocket 70 enables the sprockets 68, 70 to bracket the support frame 26.

The described structure can also be contained in a kit for adding or replacing a track drive 24 of outdoor power equipment 20. The kit can constitute two separate components: first, a track drive assembly 160 as shown in FIGS. 2 and 3 consisting of the support frame 26; the hub bearing 64 mounted on the interior half sprocket 68 and the support frame 26; the endless track 130; the plurality of idler wheels 96; the plurality of bogie wheels 98, 106; and the outer support link 120; and second, a plurality of hardware fasteners. In this arrangement, the track drive 24 can be attached to the associated drive hub 54 by simply applying a fastener or a plurality of fasteners to the threaded studs 56 in order to secure the single assembly 160 to the outdoor power equipment 20. As such, the track drive 24 can be attached to outdoor power equipment 20 without the need for disassembling any portion of the track drive 24. At the time of assembly (in the case of a new piece of outdoor power equipment 20) or when replacing a tire/wheel assembly (in the case of a replacement kit), the track drive 24 can be easily attached to the outdoor power equipment with only one tool.

In some outdoor power equipment 20 using track drives as steering elements creates a significant lateral offset at the mounting surface of the track drive. The resulting track width between left and right tracks (measured at the ground) is wider than equivalent tires (which have a favorable offset and can so be closer together). While this is not a problem for non-steering track drives. When mounting these tracks on the front steering end of a utility vehicle in place of tires, the result is an increase in the scrub radius as well as a much larger footprint. Together these two things combine to make the turning force required at the steering wheel much greater than a similarly equipped wheel unit, especially at low speeds. This can necessitate a relatively large power (and expensive both power and cost-wise) steering assist force.

The present disclosure substantially reduces the scrub radius. The drive sprocket (and roller support structure) now rests on the relatively large hub bearing (in comparison to other models) which allows a laterally offset mounting face through the center of the bearing. The drive lugs are in the center of the track but the mounting face of the sprocket is moved a few inches outboard. This means the track assembly moves inboard when mounted to the wheel hub and thus reduces scrub radius. Additionally, the track has been modified to have geometric symmetry about a vertical-lateral plane. This enables use of the same track drive for the left and right sides of the outdoor power equipment.

Figure 7:
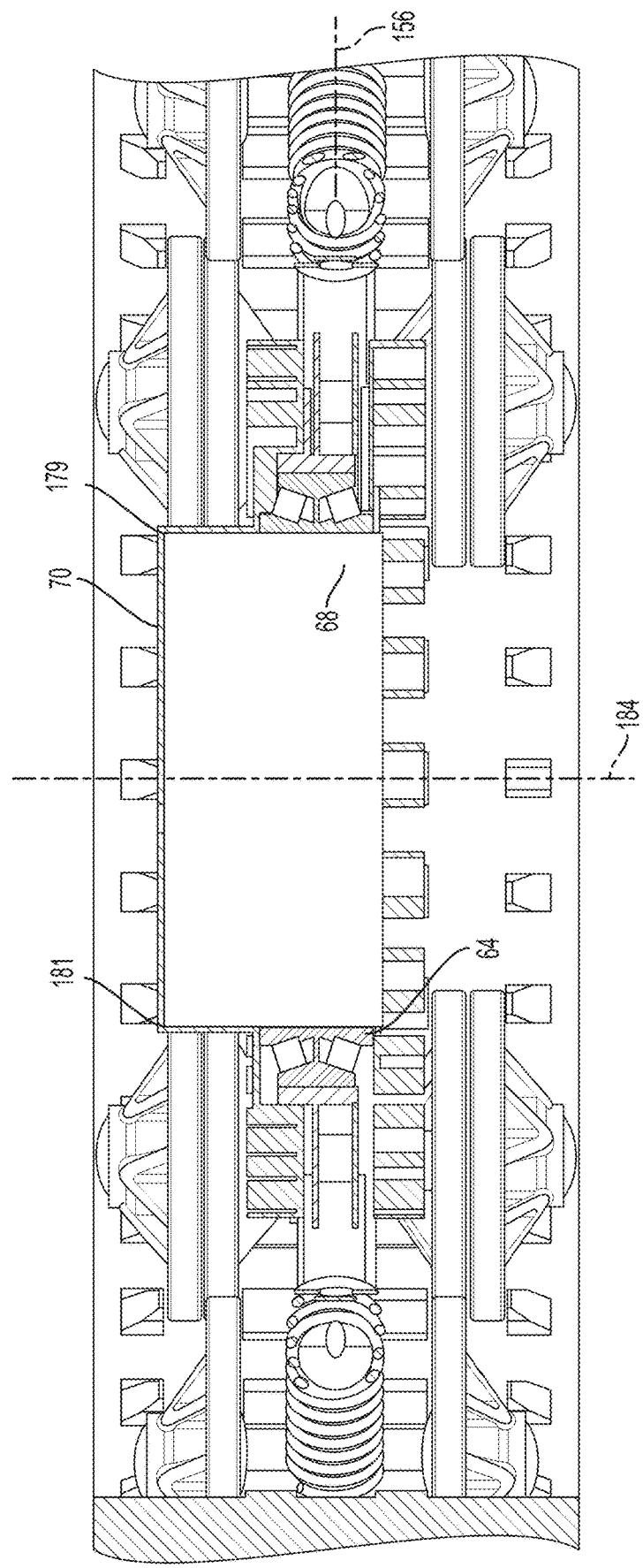
FIG. 7 is cross-section view of the track drive of FIG. 1 showing the nesting half sprockets.

Turning to FIG. 7, a downward facing cross-section view of the track drive 24 is shown. The interior half sprocket 68 is shown, and the exterior half sprocket 70 is shown to depict the nesting feature of the half sprockets 68, 70. An inside diameter 179 of the cylindrical portion 172 of the exterior half sprocket 70 is greater than an outside diameter 181 of the cylindrical portion 170 of the interior half sprocket 68. With this configuration, the interior half sprocket 68 is configured to nest within the exterior half sprocket 70. In one example, the interior half sprocket 68 of FIG. 4 and the exterior half sprocket 70 of FIG. 5 are configured to nest together in a relatively snug fit. Such a fit can reduce and/or eliminate the opportunity for either half sprocket 68, 70 to leave its normal orientation centered about the central axis 184.

The support frame 26, in which the outer race of the hub bearing 64 is mounted. These interior half sprocket 68 and exterior half sprocket 70 halves now nest and capture the inner races of the hub bearings 64. Turning to FIG. 8 for greater detail, the relative change in mounting offset is shown by the dotted line 210 (old design mounting face) and line 212 (new design mounting face). The center of rotation for each configuration is noted by a target (+sign) 220 for the old design and target 222 for the new design. The distance between this target 220, 222 and the centerline 156 of the track (y-axis) is the scrub radius. The scrub radius for the new design is significantly less than the old design and nearly zero. Therefore, the turning force should be greatly reduced.

The described combination of components can provide many advantages. For example, the split drive sprocket can enable a centrally positioned support frame which can result in a lighter, stronger framework compared to some typical frames. Many previous frames extend over sprockets and wheels and bend back to support the sprockets, bogies, and idlers, for example, in an L-shape or a U-shape. The straight support frame described in this disclosure can reduce and/or eliminate significant bending moments on the support frame. The disc-shaped half sprockets can provide separation for hub bearing loading in the centrally positioned support frame. The split drive sprocket can also enable space to place structure centrally to the drive sprocket, including the support frame, bearings, etc.

Additionally, the present disclosure can enable the use of lighter track device support frames due to the fact that the support frame is mounted closer to the lawn maintenance tool (i.e., the support frame has a significantly shorter cantilever distance away from the lawn maintenance tool). This allows a more favorable scrub radius than many other designs. For example, the apparatus of the present disclosure can enable track devices to be more 'steerable' as a scrub radius of exactly zero can be designed into the system.

Also, the effective rolling radius of the described structure can be the same or about the same as a pneumatic tire that it replaces. This can have multiple benefits including 1) lack of requirement to gear-up or gear-down the drive train to reproduce the same ground speed when replacing the tire, 2) eliminating the need to increase the height of the outdoor power equipment—this can maintain the same center of gravity of the outdoor power equipment and maintain handling characteristics, 3) maintaining the designed speed of the outdoor power equipment after replacing pneumatic tires with a track drive assembly. Some previous support frames required the use of a smaller drive sprocket due to interference with bogie wheels which, in turn, required a gear down for the drive train.

Other benefits of the described structure stem from the cantilevered support of the small bogie wheel from the outer support link. In this arrangement, the small bogie wheel can be placed astride the drive sprocket and relatively evenly distribute the weight of the power outdoor equipment over the length of the endless track which is in contact with a driven surface. In other words, there is no appreciable open space on the endless track from front to rear enabling relatively uneven weight distribution along the endless track. The outer support link enables proper support of the small bogie wheel despite the fact that the small bogie wheel is separated from the support frame by the spinning drive sprocket. Also, the small bogie wheel placed astride the drive sprocket helps prevent the endless track from bending upward to meet the drive sprocket. As previously described and as seen in FIGS. 2 and 3, there is a distance between the drive sprocket and the endless track at the lower portion of the drive sprocket such that the two do not touch at that location during operation. In the event of the track device passing over a firm obstacle such as a large branch, the small bogie wheels will prevent the branch from deforming the endless track to meet the spinning drive sprocket and negatively affecting the operation of the track device.

Furthermore, the split drive sprocket enables the frame structure to be located between the sprocket halves. This structure can be lighter because it does not have to withstand the bending loads inherent in most existing track designs. The track components themselves can then be symmetric and assembled to be installed on either left or right sides of the vehicle.

FIGS. 9A-D are elevations views of several embodiments of the track drive assembly 24 of FIG. 1.

While this disclosure has been written in conjunction with the specific embodiments described above, it is evident that many alternatives, combinations, modifications and variations are apparent to those skilled in the art. Accordingly, the described embodiments of this disclosure, as set forth above are intended to be illustrative only, and not in a limiting sense. Various changes can be made without departing from the spirit and scope of this disclosure. Combinations of the above embodiments and other embodiments will be apparent to those of skill in the art upon studying the above description and are intended to be embraced therein. Therefore, the scope of the present disclosure is defined by the appended claims, and all devices, processes, and methods that come within the meaning of the claims, either literally or by equivalence, are intended to be embraced therein. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A track drive for outdoor power equipment comprising:
a support frame having a support frame centerline;
a hub bearing attached to said support frame;
a drive sprocket attached to said hub bearing, wherein said drive sprocket comprises an interior half sprocket and an exterior half sprocket, said interior half sprocket is configured to nest within said exterior half sprocket,
wherein said drive sprocket is configured to attach to an associated drive hub on said outdoor power equipment,
wherein said drive sprocket comprises drive teeth spaced radially about said drive sprocket,
wherein a first set of said drive teeth are attached to said interior half sprocket and are located on an interior side of said support frame,
wherein a second set of said drive teeth are attached to said exterior half sprocket and are located on an exterior side of said support frame,
wherein said hub bearing enables said drive sprocket to rotate relative to said support frame; and
an endless track,
wherein said drive sprocket is movably engaged with said endless track to transmit a rotational force to rotate said endless track and propel said outdoor power equipment.

2. The track drive according to claim 1, wherein said drive sprocket further comprises a mounting face and said mounting face is located on said exterior side of said support frame.

3. The track drive according to claim 1, wherein a distance between said mounting face and said centerline is substantially equal to a distance between said mounting face and a center of rotation of said track drive.

4. The track drive according to claim 1, wherein a center of rotation of said track drive is located on said support frame centerline.

5. The track drive according to claim 1, wherein said endless track is symmetrical about said support frame centerline.

6. The track drive according to claim 1, wherein said interior half sprocket further comprises an outside diameter and said hub bearing is located around said outside diameter.

7. The track drive according to claim 1, wherein said endless track further comprises a centerline, and said support frame centerline is colinear to said centerline of said endless track.

8. The track drive according to claim 1, wherein said support frame defines an aperture, said aperture being located substantially on a center line of said support frame with respect to a forward side and a rear side of said support frame, and said hub bearing is mounted in said aperture.

9. The track drive according to claim 1, wherein said track drive is configured to be attached to the associated drive hub by applying a fastener to a single assembly.

10. The track drive according to claim 1, further comprising a track tensioning mechanism to maintain tension on said endless track.

11. The track drive according to claim 10, wherein said track tensioning mechanism comprises a threaded component to maintain tension on said endless track.

12. The track drive according to claim 10, wherein said track tensioning mechanism comprises a spring device to maintain tension on said endless track.

13. The track drive according to claim 1, further comprising:
a plurality of idler wheels;
a plurality of bogie wheels; and
an outer support link attached to said support frame, said outer support link is configured to support said idler wheels and said bogie wheels.

14. The track drive according to claim 13, wherein said endless track further comprises:
a plurality of guide lugs which locate said endless track with respect to said idler wheels and said bogie wheels; and
a plurality of drive lugs which enable transfer of power between said drive sprocket and said endless track.

15. The track drive according to claim 14, wherein said idler wheels and said bogie wheels are positioned between said drive lugs and said guide lugs.

16. The track drive according to claim 13, wherein a weight of said outdoor power equipment is transferred through said associated drive hub, said drive sprocket, said hub bearing, said support frame, said bogie wheels and said idler wheels, said endless track, and into an associated driving surface, and said drive sprocket is engaged with said endless track at a top portion of said drive sprocket and not engaged with said endless track at a bottom portion of said drive sprocket.

17. An outdoor power equipment unit comprising:
a track drive, said track drive comprising:
a support frame having a support frame centerline;
a hub bearing attached to said support frame;
a drive sprocket attached to said hub bearing, wherein said drive sprocket comprises an interior half sprocket and an exterior half sprocket, said interior half sprocket is configured to nest within said exterior half sprocket,
wherein said drive sprocket is configured to attach to an associated drive hub on said outdoor power equipment,
wherein said drive sprocket comprises drive teeth spaced radially about said drive sprocket,
wherein a first set of said drive teeth are attached to said interior half sprocket and are located on an interior side of said support frame,
wherein a second set of said drive teeth are attached to said exterior half sprocket and are located on an exterior side of said support frame,
wherein said hub bearing enables said drive sprocket to rotate relative to said support frame; and
an endless track,
wherein said drive sprocket is movably engaged with said endless track to transmit a rotational force to rotate said endless track and propel said outdoor power equipment.

18. A kit for adding or replacing a track drive of outdoor power equipment comprising:
a. a track drive assembly comprising:
a support frame having a support frame centerline;
a hub bearing attached to said support frame;
a drive sprocket attached to said hub bearing, wherein said drive sprocket comprises an interior half sprocket and an exterior half sprocket, said interior half sprocket is configured to nest within said exterior half sprocket,
wherein said drive sprocket is configured to attach to an associated drive hub on said outdoor power equipment,
wherein said drive sprocket comprises drive teeth spaced radially about said drive sprocket,
wherein a first set of said drive teeth are attached to said interior half sprocket and are located on an interior side of said support frame,
wherein a second set of said drive teeth are attached to said exterior half sprocket and are located on an exterior side of said support frame,
wherein said hub bearing enables said drive sprocket to rotate relative to said support frame;
an endless track,
wherein said drive sprocket is movably engaged with said endless track to transmit a rotational force to rotate said endless track and propel said outdoor power equipment; and
b. a plurality of hardware fasteners.

19. A track drive for outdoor power equipment comprising:
a support frame having a support frame centerline;
a hub bearing attached to said support frame;
a drive sprocket attached to said hub bearing, wherein said drive sprocket comprises an interior half sprocket and an exterior half sprocket, said interior half sprocket is configured to nest within said exterior half sprocket,
wherein said drive sprocket is configured to attach to an associated drive hub on said outdoor power equipment,
wherein said drive sprocket comprises drive teeth spaced radially about said drive sprocket,
wherein a first set of said drive teeth are attached to said interior half sprocket and are located on an interior side of said support frame,
wherein a second set of said drive teeth are attached to said exterior half sprocket and are located on an exterior side of said support frame,
wherein said hub bearing enables said drive sprocket to rotate relative to said support frame;
an endless track; and
an outer support link attached to said support frame, said outer support link is configured to support a bogie wheel in a cantilever arrangement,
wherein said drive sprocket is movably engaged with said endless track to transmit a rotational force to rotate said endless track and propel said outdoor power equipment, an outer support link attached to said support frame, said outer support link is configured to support a bogie wheel in a cantilever arrangement.

* * * * *